(12) United States Patent
Rimaux

(10) Patent No.: US 7,584,040 B2
(45) Date of Patent: Sep. 1, 2009

(54) METHOD OF CVT CONTROL IN A VEHICLE FOR ADAPTING ITS NOISE CHARACTERISTICS WITH PERMANENT AND TRANSIENT MODES

(75) Inventor: Stéphane Rimaux, Meudon (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 10/538,172

(22) PCT Filed: Feb. 3, 2004

(86) PCT No.: PCT/FR2004/000249

§ 371 (c)(1),
(2), (4) Date: Jun. 9, 2005

(87) PCT Pub. No.: WO2004/074138

PCT Pub. Date: Sep. 2, 2004

(65) Prior Publication Data

US 2006/0271264 A1 Nov. 30, 2006

(30) Foreign Application Priority Data

Feb. 4, 2003 (FR) .................................. 03 01273

(51) Int. Cl.
*G06F 19/00* (2006.01)
*G06F 7/00* (2006.01)
*G06F 17/00* (2006.01)

(52) U.S. Cl. .............................. 701/54; 701/51; 701/52; 701/53; 701/55; 701/56; 701/57; 701/58; 701/59; 701/60; 701/61; 701/62; 701/63; 701/64; 701/65; 701/66; 701/87; 701/95; 180/337; 180/338; 180/347; 180/350; 180/357; 180/366; 180/368; 474/11; 474/23; 474/70; 474/101; 476/1; 476/4; 476/5; 476/6; 476/47; 476/48; 476/49; 476/50; 476/51; 476/52; 476/53; 476/54; 476/55; 476/56; 476/57; 476/58; 476/59; 476/60; 477/34; 477/37; 477/41; 477/43; 477/44; 477/46; 477/68; 477/70; 477/73; 477/74; 477/75; 477/79; 477/101; 477/166; 74/15.8; 74/15.84; 74/15.86; 74/15.88; 74/473.1; 74/473.12; 74/473.24; 74/473.29

(58) Field of Classification Search ............ 701/51–66, 701/87, 95; 474/18, 28, 11, 23, 70, 101; 476/47–58, 1, 4, 5, 6, 11, 59, 60; 180/366, 180/368, 337, 338, 347, 350, 357; 477/34, 477/37, 41, 43, 44, 46, 68, 70, 73, 74, 75, 477/79, 101, 166; 74/15.8, 15.84, 15.86, 74/15.88, 473.1, 473.12, 473.24, 473.29
See application file for complete search history.

(56) References Cited

U.S. PATENT DOCUMENTS

| 4,701,853 | A | * | 10/1987 | Osanai | 701/58 |
| 4,704,683 | A | * | 11/1987 | Osanai | 701/51 |
| 4,836,056 | A | * | 6/1989 | Nakawaki et al. | 477/43 |
| 4,945,483 | A | * | 7/1990 | Tokoro | 701/60 |
| 5,558,596 | A | * | 9/1996 | Adachi et al. | 701/57 |
| 6,123,642 | A | * | 9/2000 | Saito et al. | 477/3 |

| | | | |
|---|---|---|---|
| 6,188,946 B1* | 2/2001 | Suzuki et al. | 701/62 |
| 6,292,730 B1* | 9/2001 | Takizawa et al. | 701/51 |
| 6,314,347 B1* | 11/2001 | Kuroda et al. | 701/22 |
| 6,813,551 B2* | 11/2004 | Taniguchi et al. | 701/59 |
| 7,037,236 B2* | 5/2006 | Ishibashi et al. | 477/52 |
| 7,108,087 B2* | 9/2006 | Imai | 180/65.23 |
| 7,178,618 B2* | 2/2007 | Komeda et al. | 180/65.275 |
| 7,344,473 B2* | 3/2008 | Ishibashi et al. | 477/52 |
| 2002/0065165 A1* | 5/2002 | Lasson et al. | 477/3 |
| 2002/0107618 A1* | 8/2002 | Deguchi et al. | 701/22 |
| 2003/0098185 A1* | 5/2003 | Komeda et al. | 180/65.2 |
| 2003/0149520 A1* | 8/2003 | Taniguchi et al. | 701/59 |
| 2004/0251064 A1* | 12/2004 | Imai | 180/65.2 |
| 2006/0183581 A1* | 8/2006 | Iwatsuki et al. | 474/8 |

FOREIGN PATENT DOCUMENTS

| | | |
|---|---|---|
| EP | 1 079 149 A2 | 2/2001 |
| FR | 2 729 343 | 7/1996 |
| FR | 2729343 A1 * | 7/1996 |
| FR | 2 760 060 | 8/1998 |

\* cited by examiner

*Primary Examiner*—Khoi Tran
*Assistant Examiner*—Jorge O Peche

(74) *Attorney, Agent, or Firm*—Nicolas E. Seckel

(57) ABSTRACT

The following steps are performed in the control method:
  determining a mode of operation from amongst a permanent mode and a transient mode, as a function of a set of variables comprising said estimated values;
  correcting the value of the speed of rotation of the outlet shaft in such a manner that:
    if the mode has been determined as being the permanent mode, then the moving average (L') of the gear ratio (L) over a period (T) of a plurality of unit time intervals lies between a first threshold value ($S_1$) that is negative and a second threshold value ($S_2$) that is positive; and
    if the mode has been determined as being the transient mode, then said moving average (L') of the gear ratio (L) lies outside the range of values defined by the first and second threshold value ($S_1$, $S_2$).

18 Claims, 1 Drawing Sheet

METHOD OF CVT CONTROL IN A VEHICLE FOR ADAPTING ITS NOISE CHARACTERISTICS WITH PERMANENT AND TRANSIENT MODES

The invention relates to a method of controlling a continuously-variable drive train of a motor vehicle.

BACKGROUND ART

In known manner, and as shown in FIG. 1, a drive train 1 comprises an engine unit 2, a variable-speed transmission 4, and a set of drive wheels 6.

The drive train 1 further comprises various transmission elements, in particular an engine outlet shaft 8 transmitting rotary motion from the outlet of the engine unit 2 to the variable-speed transmission 4, and a wheel shaft 9 transmitting rotary motion from the outlet of the variable-speed transmission 4 to the set of drive wheels 6, via transmission elements that are not shown but that are well known in the state of the art.

In order to avoid overburdening the description below, the engine unit is referred to as the "engine", it being understood that the engine unit 2 could be constituted by a fuel-burning engine alone, or equally well by other types of engine or motor, or indeed by an association of drive units, for example a fuel-burning engine and an electric motor for a hybrid vehicle.

Similarly, the set of drive wheels 6 is represented by a single wheel, it being understood that as a general rule the set of drive wheels 6 comprises two wheels or four wheels.

Elements of the transmission that have no bearing on setting out the invention are not shown in the diagram of FIG. 1.

The variable-speed transmission 4 is adapted to vary the ratio of the speeds of rotation of the wheel shaft 9 and the engine outlet shaft 8 on a continuous basis, where said ratio is directly associated by a continuous function with the gear ratio L, i.e. the ratio of the vehicle speed V divided by the speed of rotation $\omega$ of the engine outlet shaft 8, or the engine speed.

Control of engine speed and of the variable-speed transmission 4 is provided by a function in a computer 11 (e.g. a computer associated with the engine, or a "gearbox" computer, or some other computer on board the vehicle). The computer receives a certain amount of information relating to the operation of the vehicle, and in particular of the drive train and of the acceleration control as actuated by the driver. In response, it issues two control signals $C_2$ and $C_4$ respectively for the engine 2 and for the variable-speed transmission 4, respectively representative of an engine torque setpoint and of a rotary speed ratio setpoint.

The vehicle has a certain number of sensors and/or computation modules serving to estimate values for a set of variables corresponding to the information to be supplied to the computer 11 in order to control the engine 2 and the variable-speed transmission 4. In particular, the vehicle may be provided with a sensor for sensing the position of the accelerator pedal, and adapted to provided the computer 11 with an estimate of the value for the acceleration control variable $P_1$, e.g. in terms of a percentage travel of the acceleration pedal relative to its total stroke.

The vehicle also has a vehicle speed sensor which provides the computer 11 with an estimated value for the speed V of the vehicle.

Means for estimating the value of the speed of rotation $\omega$ of the engine outlet shaft 8 are also provided, enabling the corresponding information to be supplied to the computer 11.

Methods are known in the state of the art for controlling a continuously-variable drive train, in which a unit time interval $t_i$ is defined, and in which the following steps are performed at each instant corresponding to each unit time interval:
- estimating the value of an acceleration control variable;
- estimating the value of the vehicle speed;
- estimating the value of the speed of rotation of the engine outlet shaft; and
- controlling the speed of rotation of the engine outlet shaft (or the gear ratio of the variable-speed transmission) as a function of said estimated values.

The control strategies used in known control methods sometimes lead to performance of excellent quality, both in terms of optimizing energy consumption and in terms of converting the driver's intention into vehicle speed and wheel torque. Such control strategies are presented in the form of prerecorded maps.

Unfortunately, known methods produce sensations that are poorly accepted by drivers, in particular they produce a sensation of skidding due to the relative changes between engine speed and vehicle speed. It is also found that there are frequent and large variations in engine speed for small variations in the position of the accelerator pedal.

An extremely severe defect of continuously-variable drive trains operated using the above-mentioned methods, consists in unacceptable noise stemming from the above-mentioned drawbacks and due both to the noise levels reached and also to the difference between the "expectations" of users and the noise generated by the engine.

SUMMARY OF THE INVENTION

The main object of the invention is to remedy the above-mentioned drawbacks, by proposing a control method of the above-described type that enables the sensation of skidding, the variations in engine speed, and the noise characteristics all to be brought into ranges close to those that correspond to drive trains of conventional type (in particular with manual gearboxes).

To this end, according to the invention, control is performed by the following steps:
- determining a mode of operation from amongst a permanent mode and a transient mode, as a function of a set of variables comprising said estimated values; and
- correcting the value of the speed of rotation of the outlet shaft in such a manner that:
  - if the mode has been determined as being the permanent mode, then the moving average of the gear ratio over a period of a plurality of unit time intervals lies between a first threshold value that is negative and a second threshold value that is positive; and
  - if the mode has been determined as being the transient mode, then said moving average of the gear ratio lies outside the range of values defined by the first and second threshold value.

According to other characteristics of the method of the invention:
- the first threshold value is, in absolute value, equal to the second threshold value;
- the period is of a duration greater than one second, and the first threshold value and the second threshold value has absolute values lying in the range 0.35 kilometers per hour (km/h) per 1000 revolutions per minute (rpm) per second (s) to 0.45 km/h per 1000 rpm/s;
- the duration of a stage in transient mode is limited to a value lying between a third threshold and a fourth threshold;

the third threshold value is substantially equal to 0.3 s;

the fourth threshold value is substantially equal to 0.7 s;

the absolute value of the mean variation of the gear ratio over an operating stage in transient mode between two consecutive mode changes is limited to a value lying between fifth and sixth threshold values that are positive;

during the initial mode change of operating stage into transient mode, the direction of variation in the gear ratio is determined and:

if the direction of variation is positive, then first and second fixed values are allocated respectively to the fifth threshold value and to the sixth threshold value; and if the direction of variation is negative, then third and fourth fixed values are allocated respectively to the fifth threshold value and to the sixth threshold value;

the first fixed value is greater than the third fixed value, and the second fixed value is greater than the fourth fixed value;

the first fixed value is substantially equal to 35 km/h per 1000 rpm;

the second fixed value is substantially equal to 80 km/h per 1000 rpm;

the third fixed value is substantially equal to 25 km/h per 1000 rpm;

the fourth fixed value is substantially equal to 50 km/h per 1000 rpm;

if the mode is determined as being the permanent mode, the value of the gear ratio is limited at each instant to lie within a range of values centered on a mean value equal to the gear ratio at the initial instant of the operating stage in permanent mode plus the product of said mean variation per unit time multiplied by the period of time between said initial instant and the instant in question, said range being of predetermined amplitude;

said amplitude is substantially equal to 50 rpm;

the acceleration control variable represents the position of the accelerator pedal;

the slope of the road is estimated and the set of variables includes the estimated value for the slope; and a mode-determination period is defined, and it is determined that the mode of operation is transient mode in at least one of the following circumstances:

over said mode-determination period, the variation in the speed value and the variation in the slope value are, in absolute value, less than respective predetermined threshold values, and the variation in the value of the acceleration control variable is, in absolute value, greater than a predetermined threshold value;

over said mode-determination period, the variation in the value of the acceleration control variable and the variation in the value of the slope are, in absolute value, less than respective predetermined threshold values, and the variation in the speed value is, in absolute value, greater than a predetermined threshold value; and over said mode-determination period, the variation in the value of the acceleration control variable and the variation in the value of the speed variable are, in absolute value, less than respective predetermined threshold values, and the variation in the slope value is, in absolute value, greater than a predetermined threshold value.

DETAILED DESCRIPTION OF EMBODIMENTS

The invention is described below in greater detail with reference to FIG. 2 which is a graph showing variation over time in the gear ratio equal to the ratio of the linear speed V of the vehicle over the speed of rotation $\omega$ of the engine outlet shaft, when implementing a method in accordance with the invention.

Figure 1:
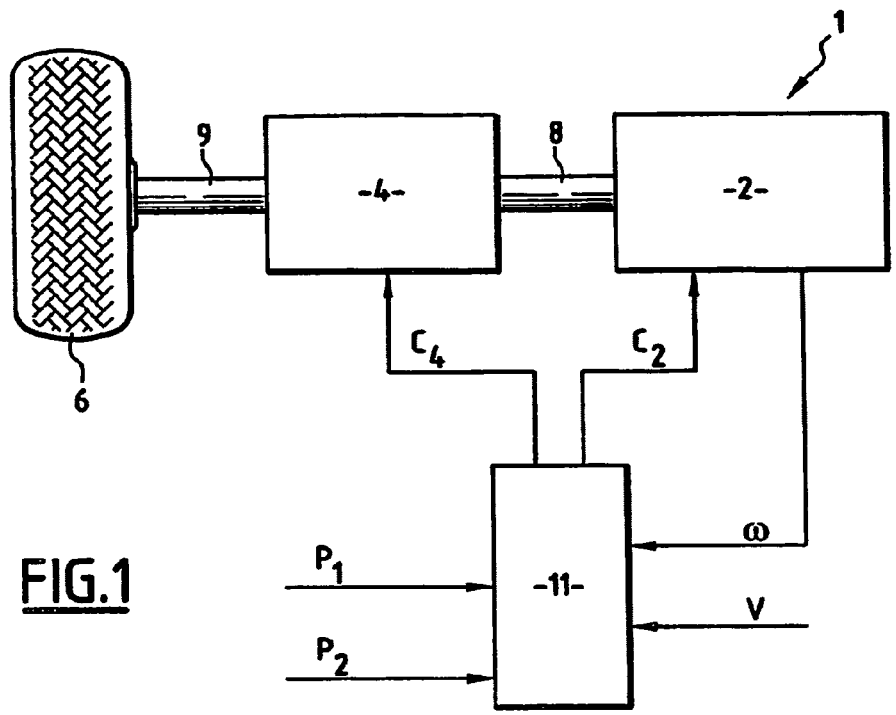
FIG. 1 shows a drive train to which a method in accordance with the invention may be applied.

With reference again to FIG. 1, the implementation of the invention described below consists in a control method using values estimated at each instant $t_i$ for the above-described variables $P_1$, $\omega$ (or L), and V, and also a slope variable $P_2$ representative of the slope of the road. This variable $P_2$ is estimated by means of a sensor or by any suitable computation means, not forming part of the invention and therefore not described in greater detail.

The set of variables need not include the gear ratio L as a measured variable.

Certain operating stages of the variable-speed transmission are associated either with a "permanent" mode of operation or else with a "transient" mode of operation.

The computer 11 operates by making use of maps that are adapted to cause the engine 2 and the variable-speed transmission 4 to operate in modes that can be thought of respectively as modes in which the gear ratio is constant, and modes in which gear ratio is changed, in the same manner as changing gear in a conventional type of drive train having discrete gear ratios.

A permanent mode corresponding to a fixed or imposed gear ratio is characterized by a time interval that can be relatively long $T_1$, $T_2$ and by little variation over said time interval in the gear ratio L.

A transition mode, comparable to changing gear, is characterized by a stage $T_0$ of relatively short duration, and by a large variation in the gear ratio L.

Figure 2:
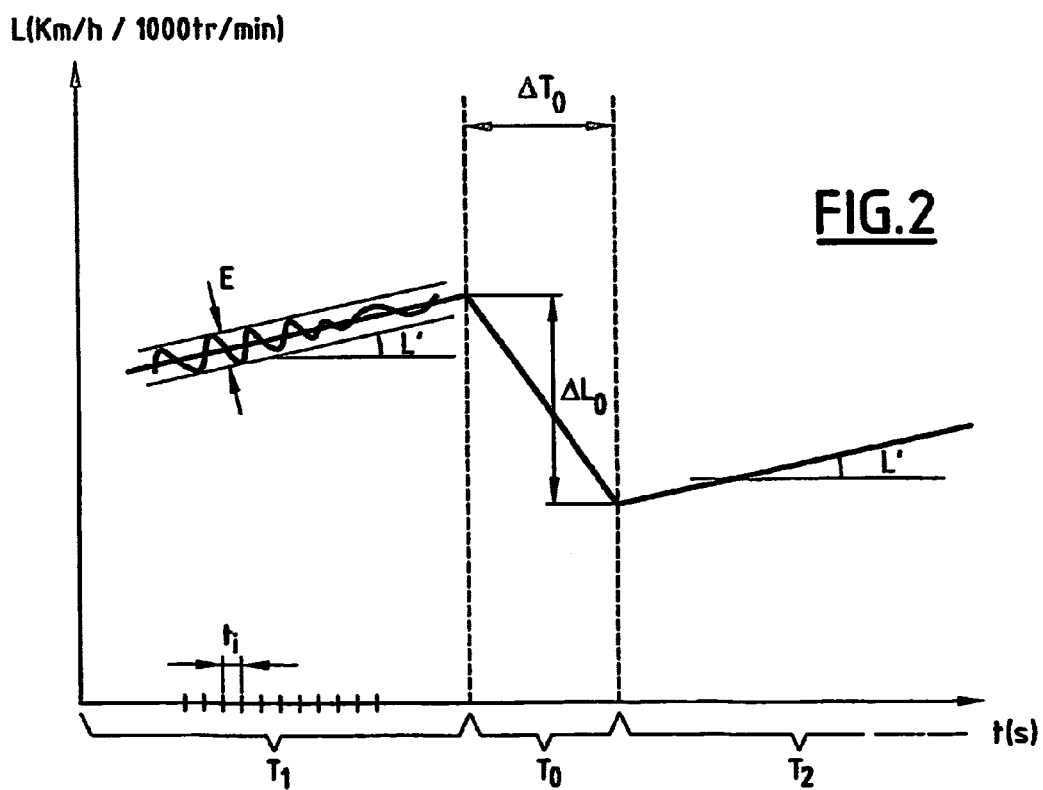
FIG. 2, is a graph showing variation over time in the gear ratio when implementing a method in accordance with the invention.

FIG. 2 shows a first stage $T_1$ and a second stage $T_2$ in which the gear ratio is imposed, these two stages being separated by a gear change state $T_0$.

Amongst the three stages, the transition from the first stage $T_1$ to the second stage $T_2$ can be thought of as a change in gear ratio of the kind that occurs when distinct ratios are defined, the change being from a given gear to a lower gear.

In the method of the invention, at each instant $t_i$ corresponding to a unit time interval of the computer 11, the operating mode of the drive train 1 is determined from amongst the two available modes: "permanent" and "transient".

The unit time interval ti is typically of the order of about 10 milliseconds (typically 10 ms), so a period of much greater duration, e.g. about one second, is defined, at the end of which the current operating mode is defined by analyzing some of the variables $P_1$, $P_2$, $\omega$ (or L), and V as supplied to the computer 11.

By way of example, one strategy option consists in determining that the mode of operation is transient mode in at least one of the following circumstances:

i) If during said mode-determination period, the variation in the speed value V and the variation in the slope value $P_2$ are, in absolute value, less than respective predetermined threshold values, and the variation in the value of the acceleration control variable $P_1$ is, in absolute value, greater than a predetermined threshold value.

This corresponds to conditions in which speed and slope are practically constant, and to a large and fast variation in the position of the accelerator pedal. This situation can lead to non-compliance of predefined conditions in the maps for optimizing the operation of the engine 2 and of the variable-speed transmission 4, because of the inertia of the vehicle and of the drive train.

ii) If over said mode-determination period, the variation in the value of the acceleration control variable $P_1$ and the variation in the value of the slope $P_2$ are, in absolute value, smaller than respective predetermined threshold values, and the variation in the speed value V is, in absolute value, greater than a predetermined threshold value.

This corresponds to conditions in which the slope and the position of the accelerator pedal are practically constant, and in which there is a large variation in speed, e.g. greater than 20 km/h.

iii) If, during said mode-determination period, the variation in the value of the acceleration control variable $P_1$ and the variation in the speed value V are, in absolute value, less than respective predetermined threshold values, and the variation in the slope value $P_2$ is, in absolute value, greater than a predetermined threshold value.

This corresponds to the vehicle speed V and the position accelerator pedal being practically constant, and to a large variation in slope, e.g. greater than 4%.

Once the operating mode has been determined, the computer 11 corrects the value o for the speed of rotation of the outlet shaft 8 of the engine 2 by acting thereon as follows:

if the mode has been determined as being the permanent mode, then the moving average L' of the gear ratio L over a period T of a plurality of unit time intervals $t_1$ lies between a first threshold value $S_1$ that is negative and a second threshold value $S_2$ that is positive; and if the mode has been determined as being the transient mode, then said moving average L' of the gear ratio L lies outside the range of values defined by the first and second threshold values $S_1$ and $S_2$.

The period T over which the moving average is taken preferably has a duration longer than one second, while nevertheless remaining of that order.

Supposing that variation in the gear ratio L as a function of time t can be represented as shown in FIG. 2 by a mean curve that is piecewise linear in pieces, with each straight line segment corresponding to an operating stage in one or other of the two modes defined above, and with each line segment corresponding to a stage in permanent mode $T_1$ and $T_2$ presenting a mean slope L' lying between the above-mentioned threshold values $S_1$ and $S_2$.

For example, the first threshold value $S_1$ and the second threshold value $S_2$ have absolute values lying in the range 0.35 km/h to 0.45 km/h per 1000 rpm/s.

Preferably, these threshold values $S_1$, $S_2$ define an acceptable range which is preferably equal to the range [−0.4; 0.4].

Another important characteristic of the method of the invention consists in limiting the amplitude in duration $\Delta t_0$ and in gear ratio variation $\Delta L_0$ during a transient operating stage $T_0$.

In particular, the duration $\Delta t_0$ of a transient mode stage $T_0$ is limited to a value lying between third and fourth threshold values $S_3$ and $S_4$.

Preferably, the third threshold value $S_3$ is substantially equal to 0.3 s, and the fourth threshold value $S_4$ is substantially equal to 0.7 s.

During the operating stage following the transient mode $T_0$ between two consecutive mode changes, the absolute value in variation of the mean $\Delta L_0$ of the gear ratio is limited to a value lying between fifth and sixth threshold values $S_5$ and $S_6$ that are positive.

During an initial mode change from the operating stage in transient mode, the direction of the variation in the gear ratio L is determined and:

if the direction of this variant is positive, first and second fixed values are assigned respectively to the fifth threshold value $S_5$ and to the sixth threshold value $S_6$; and if the direction of the variation is negative, third and fourth fixed values are assigned respectively to the fifth threshold value $S_5$ and to the sixth threshold value $S_6$.

For example, the first fixed value is substantially equal to 35 km/h per 1000 rpm, the second fixed value is substantially equal to 80 km/h per 1000 rpm, the third fixed threshold value is substantially equal to 25 km/h per 1000 rpm, and the fourth fixed value is substantially equal to 50 km/h per 1000 rpm.

Thus, the acceptable amplitude for a change in gear ratio when performing the equivalent of a change down by one gear is limited to a greater extent than the change that is acceptable when performing the equivalent of a change up by one gear.

Finally, another important characteristic of the method in accordance with the invention consists in accepting small variations during stages $T_1$, $T_2$ in permanent mode in the real gear ratio L on either side of the straight line segment representing the mean variation in gear ratio L.

This amounts at each instant to limiting the value of the gear ratio L to a range of values centered on a mean value that is equal to the gear ratio at the initial instant of the stage of operation in permanent mode plus the product of said mean variation L' per unit time multiplied by the period of time between said initial instant and the instant in question, said range having a predetermined amplitude E.

The predetermined amplitude E may be fixed or it may be given by a map having two inputs, e.g. constituted by the value for engine torque and the value for engine speed.

The amplitude accepted during the segment of variation in the mean value of gear ratio is preferably of the order of 20 km/h per 1000 rpm to 100 km/h per 1000 rpm, and if the amplitude is constant, it is preferably equal to 50 km/h per 1000 rpm.

The invention claimed is:

1. A method of controlling a continuously-variable drive train of a motor vehicle, said drive train comprising an engine unit having an outlet shaft driving a wheel shaft via a variable-speed transmission adapted to modify a ratio of a speed of rotation of the wheel shaft and of the engine outlet shaft in a continuous manner, in which method, a unit time interval ($t_1$) is defined and over each unit time interval the following steps are performed:

estimating a value of an acceleration control variable ($P_1$);
estimating a value of a vehicle speed (V);
estimating a value of a speed of rotation ($\omega$) of the engine outlet shaft; and
controlling the speed of rotation ($\omega$) of the engine outlet shaft as a function of said estimated values (P1, V, $\omega$); and wherein said control is performed by implementing the following steps:

determining a mode of operation from amongst a permanent mode and a transient mode, as a function of a set of variables comprising said estimated values ($P_1$, V, ω); and correcting the value of the speed of rotation (ω) of the outlet shaft in such a manner that:
   if the mode has been determined as being the permanent mode, then a moving average (L') of a gear ratio (L) over a period (T) of a plurality of unit time intervals ($t_1$) lies between a first threshold value ($S_1$) that is negative and a second threshold value ($S_2$) that is positive; and
   if the mode has been determined as being the transient mode, then said moving average (L') of the gear ratio (L) lies outside the range of values defined by the first and second threshold value ($S_1$, $S_2$), wherein a slope of a road is estimated and the set of variables includes the estimated value for the slope, and wherein a mode-determination period is defined, and it is determined that the mode of operation is transient mode in at least one of the following circumstances:

over said mode-determination period, a variation in the speed value (V) and a variation in the slope value are, in absolute value, less than respective predetermined threshold values, and a variation in a value of the acceleration control variable is, in absolute value, greater than a predetermined threshold value;

over said mode-determination period, the variation in the value of the acceleration control variable and the variation in the value of the slope are, in absolute value, less than respective predetermined threshold values, and the variation in the speed value is, in absolute value, greater than a predetermined threshold value; and over said mode-determination period, the variation in the value of the acceleration control variable ($P_1$) and the variation in the value of the speed variable (V) are, in absolute value, less than respective predetermined threshold values, and the variation in the slope value is, in absolute value, greater than a predetermined threshold value, enabling sensations of skidding, variations in engine speed, and noise characteristics of the engine to be brought close to those corresponding to drive trains with manual gearboxes.

2. A control method according to claim 1, wherein the first threshold value ($S_1$) is, in absolute value, equal to the second threshold value ($S_2$).

3. A control method according to claim 1, wherein the period (T) is of a duration greater than one second, and the first threshold value ($S_1$) and the second threshold value ($S_2$) has absolute values lying in the range 0.35 km/h to 0.45 km/h per 1000 rpm/s.

4. A control method according to claim 1, wherein a duration ($DT_0$) of a stage in transient mode ($T_0$) is limited to a value lying between a third threshold ($S_3$) and a fourth threshold ($S_4$).

5. A control method according to claim 4, wherein the third threshold value ($S_3$) is substantially equal to 0.3 s.

6. A control method according to claim 4, wherein the fourth threshold value ($S_4$) is substantially equal to 0.7 s.

7. A control method according to claim 1, wherein an absolute value in variation of a mean ($\Delta L_0$) of the gear ratio (L) over an operating stage in transient mode between two consecutive mode changes is limited to a value lying between fifth and sixth threshold values ($S_5$, $S_6$) that are positive.

8. A control method according to claim 7, wherein during an initial mode change of operating stage into transient mode, a direction of variation in the gear ratio (L) is determined and:
   if the direction of variation is positive, then first and second fixed values are allocated respectively to the fifth threshold value ($S_5$) and to the sixth threshold value ($S_6$); and
   if the direction of variation is negative, then third and fourth fixed values are allocated respectively to the fifth threshold value ($S_5$) and to the sixth threshold value ($S_6$).

9. A control method according to claim 8, wherein the first fixed value is greater than the third fixed value, and the second fixed value is greater than the fourth fixed value.

10. A control method according to claim 9, wherein the first fixed value is substantially equal to 35 km/h per 1000 rpm.

11. A control method according to claim 9, wherein the second fixed value is substantially equal to 80 km/h per 1000 rpm.

12. A control method according to claim 9, wherein the third fixed value is substantially equal to 25 km/h per 1000 rpm.

13. A control method according to claim 9, wherein the fourth fixed value is substantially equal to 50 km/h per 1000 rpm.

14. A control method according to claim 9, wherein the acceleration control variable ($P_1$) represents the position of the accelerator pedal.

15. A control method according to claim 1, wherein if the mode is determined as being the permanent mode, a value of the gear ratio (L) is limited at each instant to lie within a range of values centered on a mean value equal to the gear ratio (L) at an initial instant of an operating stage in permanent mode plus a product of said moving average (L') multiplied by a period of time between said initial instant and the instant in question, said range being of predetermined amplitude (E).

16. A control method according to claim 15, wherein said amplitude (E) is substantially equal to 50 km/h per 1000 rpm.

17. A control method according to claim 1, wherein the moving average (L') of the gear ratio has a fixed value during each operating stage in the permanent mode.

18. A control method according to claim 17, wherein if the mode is determined as being the permanent mode, a value of the gear ratio (L) is limited at each instant to lie within a range of values centered on a mean value equal to the gear ratio (L) at an initial instant of each operating stage in permanent mode plus a product of said moving average (L') multiplied by a period of time between said initial instant and the instant in question, said range being of predetermined amplitude (E).

* * * * *